May 7, 1946.  G. N. STRIKE  2,399,767
VALVE
Filed Sept. 14, 1944
Fig. 1.
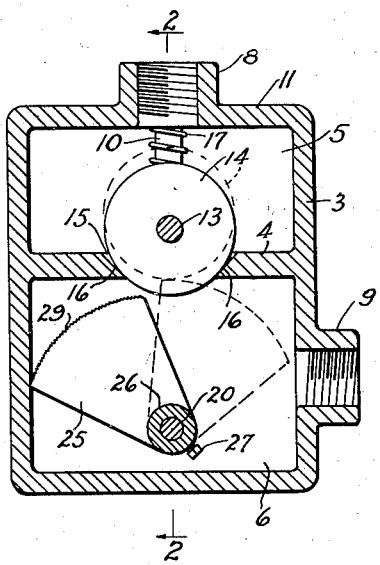
Fig. 2.
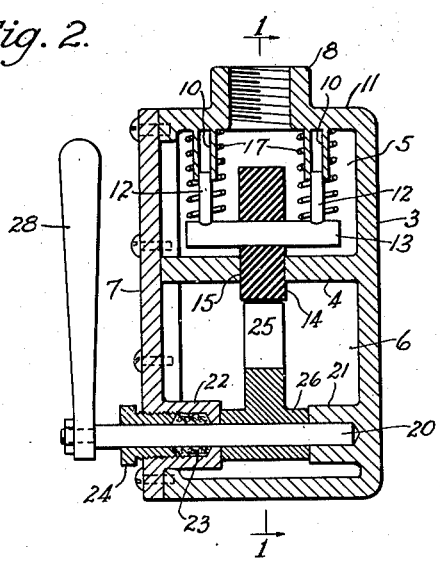
Fig. 3.
Fig. 4.
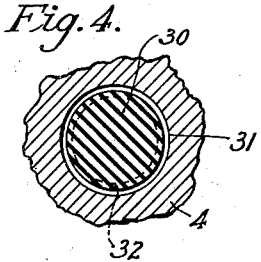
INVENTOR.
George N. Strike
BY Carlos G. Stratton
ATTORNEY Patented May 7, 1946

2,399,767

UNITED STATES PATENT OFFICE 2,399,767

VALVE

George N. Strike, Los Angeles, Calif.

Application September 14, 1944, Serial No. 553,981

5 Claims. (Cl. 251—132)

My invention relates to a valve, and more particularly to a valve for controlling the flow of liquid through a conduit.

An important object of the invention is to provide a valve that will not seat in the same position after each operation.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes embodiments of the present invention, which are given by way of illustration or example only.

In the drawing, like reference characters designate similar parts in the several views.

Fig. 1 is a vertical section through an embodiment of the foregoing objects, taken on the line 1—1 of Fig. 2.

Fig. 2 is a vertical section taken on the line 2—2 of Fig. 1.

Fig. 3 is the upper portion of a sectional view similar to Fig. 2 but showing a modified form of construction.

Fig. 4 is an enlarged section taken on the line 4—4 of Fig. 3.

Referring more in detail to the drawing, the reference numeral 3 generally designates a housing that is divided by a partition 4 into an inlet chamber 5 and an outlet chamber 6. A cover 7 is bolted on a side of the housing 4.

A threaded inlet member 8 connects with the inlet chamber 5, while a threaded outlet member 9 connects with the outlet chamber 6.

Depending from the upper side 11 of the inlet chamber 5 are relatively fixed sleeves 10. Slidable lengthwise within these sleeves are pins 12 mounted upon a shaft 13. The shaft 13 carries a freely rotatable closure member 14, preferably of resilient material. The closure member 14 is shown in the form of a wheel that is movable to and from a closing position with respect to an opening 15 in the partition 4. It is to be understood that other shapes of closure members may be used: e. g. spherical, as shown in Fig. 3. The opening 15 provides a seat 16 for the closure member.

Springs 17 urge the closure member 14 to a closed position, shown in full lines in Fig. 1. The springs 17 are coiled around the sleeves 10, and abut the top side of the chamber 5 and the shaft 13.

A crankshaft 20 is mounted in inwardly projecting journals 21 and 22 in the outlet chamber 6. Packing 23 maintains the crankshaft 20 in liquid-tight contact with the journal 22, by means of a gland 24. Arranged on the crankshaft 20 is a closure member actuating means in the form of a cam 25. The cam 25 has a collar 26 that centers the cam between the journals 21 and 22, and a set-screw 27 fixes the collar 26 on the shaft. A handle 28 is provided on the projecting end of the crankshaft 20 for manipulation. The face 29 of the cam 25 may be roughened, if desired, but this is optional, depending upon the material and density of the material of the closure member 14.

In the form shown in Figs. 3 and 4, the freely rotatable closure member 30 is substantially a sphere, and an opening or seat 31 in the partition 4 for the spherical closure member 30 is circular in plan, so that the curved surface of the closure member will close the opening around its circumference. In all respects not specially mentioned, the construction in Fig. 3 is similar to the construction in Figs. 1 and 2. A view taken at right angles to Fig. 3 would appear the same as Fig. 1, providing the closure member were shaded to represent the curved surface. Otherwise, the construction and arrangement of Fig. 3 are similar to the first form described.

In the operation of my present invention, the valve housing 3 is connected in a liquid line in such a manner that the liquid flows from the inlet 8 to the outlet 9.

The full line position of closure member 14 in Fig. 1 indicates the closed or shut-off position. If the cam 25 is rotated clockwise in Fig. 1, the closure member 14 is moved away from its seat 16. When the cam 25 has moved to the broken line position shown in Fig. 1, the closure member 14 has been raised to its broken line position shown in the same figure. The springs 17 are compressed during the opening movement of the closure member 14, so that when the cam releases such member, the springs re-seat the closure member. Of course, the rotation of the cam 25 is effected by turning the handle 28.

The operation of the form shown in Figs. 3 and 4 is similar to that just described, the main difference being that the spherical closure member 30 sits in the round opening 31 that tapers down to a sharp edge 32, forming a seat.

It is believed clear that by reason of the slippery, watery film that the closure member 14 or 30 receives every time the valve is turned on, there is not a positive grip between the cam 25 and the closure member. In fact, if desired, the face 29 of the cam may be made smooth to permit even more slippage between the closure member and the cam.

In any event, both forms of the closure member are permitted to seat in different positions from time to time, so that the same portion of the closure member does not engage the seat every time.

The speed in turning on and off my present valve is a factor in the amount of slippage between the cam 25 and the closure member 14 or 30. A quick turning on and/or off tends to increase the amount of slippage between these parts, due to the inertia and momentum of the closure member. Moreover, the springs 17 are relatively weak springs that do not strongly force engagement of the closure member with the cam 25. These springs are principally to influence the closure member to return towards its seat. Of course the flow of liquid aids in moving the closure member back to its seat, when released by the cam 25.

While I have illustrated and described what I now regard as the preferred embodiments of my invention, the construction is, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. In a valve, a housing having inlet and outlet means, apertured means in the housing providing a seat at such aperture, a shaft within the housing and free of the walls thereof, a curved, smooth-surfaced closure member freely rotatable on the shaft, spring means urging the shaft at both sides of the closure member to a position in which the curved, smooth surface of such member closes the aperture, a rotatable cam arranged to contact such smooth, curved surface of the closure member to move such member from its seat, against the action of the spring means, the cam adapted to contact with such smooth surface to cause the closure member to rotate relative to the cam, to present different portions of such smooth surface to the seat upon closing movements, and means to rotate said cam.

2. In a valve, a housing having inlet and outlet means, a partition in the housing having an aperture providing a seat, a turnable closure member arranged to present different engaging portions of the seat, a shaft mounting said closure member, mutually engaging guide means on the shaft and housing, a cam rotatably mounted in the housing to move the closure member from said seat and to turn such member simultaneously, the cam having a wiping contact with the closure member to cause such member to move rotatingly from its seat, to present a different portion of the surface of such member to the seat upon again seating, and means external of the housing to rotate the cam to and from its closure unseating position.

3. In a valve, a housing having a partition dividing same into two chambers, one of said chambers having an inlet and spaced guide means and the other having an outlet, said partition provided with an aperture forming a seat, a valve member to engage said seat, a shaft upon which said valve member is rotatably mounted, said shaft having means co-operating with said guide means to hold same aaginst axial movement, means between said shaft and the upper wall of said inlet chamber normally urging said valve member to engagement with said seat, a member in said outlet chamber having an arcuate surface adapted for wiping contact with said valve member to move the same rotatingly from its seat, a shaft journaled in said outlet chamber mounting said member, and a lever to oscillate said shaft and the arcuate member thereon relative to said valve member.

4. In a valve, a housing having a partition forming therein an inlet chamber and an outlet chamber and provided with a seat, the upper wall of said housing having depending guides, a valve member in said inlet chamber to engage said seat, a shaft upon which said valve is mounted for rotation relative thereto, said shaft having means at both sides of said valve member co-operating with said depending guides, means exerting pressure on said shaft normally to urge said valve member to seating position, a segmental body in said outlet chamber having an arcuate periphery adapted for wiping contact with said valve member to move same rotatingly from its seat, a shaft journaled in said outlet chamber fixedly mounting said member, and a lever connected to said shaft to oscillate said arcuate member relative to said valve member.

5. In a valve, a housing having inlet and outlet means, a partition in said housing having a circular aperture providing a seat, a rotatable closure member arranged to engage said seat, a shaft to support the closure member, pressure means engaging the shaft to urge the closure member normally to its seat, a segmental cam arranged to engage and to move the closure member bodily from its seat and simultaneously to cause said closure member to present different portions of the surface thereof to the seat, and means to operate said cam.

GEORGE N. STRIKE.